Oct. 1, 1946.    L. B. GREEN    2,408,630
APPARATUS FOR MOLDING PLASTIC MATERIAL
Filed Oct. 21, 1943
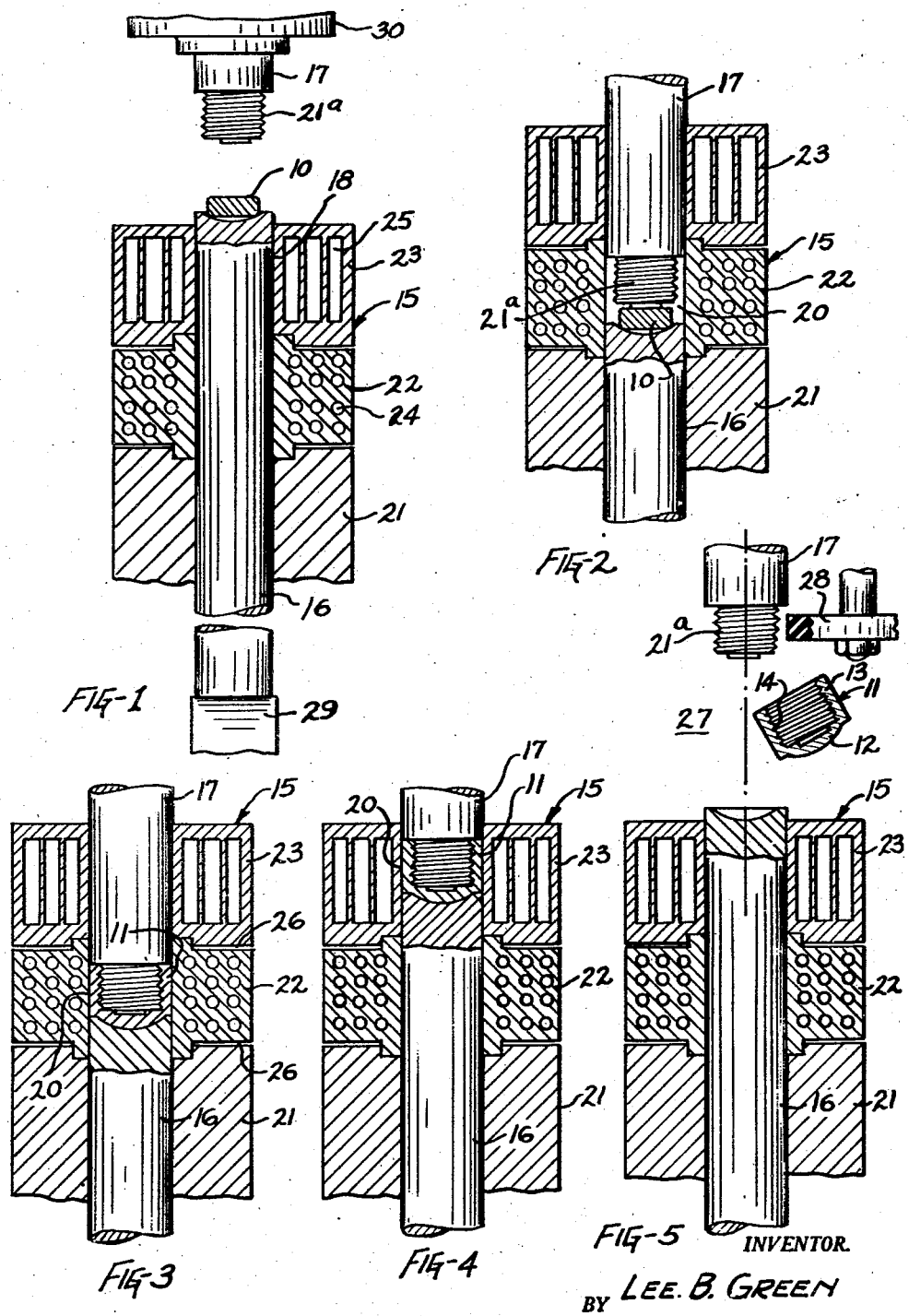
INVENTOR.
BY LEE. B. GREEN
ATTORNEYS Patented Oct. 1, 1946

2,408,630

UNITED STATES PATENT OFFICE 2,408,630

APPARATUS FOR MOLDING PLASTIC MATERIAL

Lee B. Green, Lakewood, Ohio

Application October 21, 1943, Serial No. 507,119

1 Claim. (Cl. 18—17)

This invention relates to the molding of plastic material and aims to provide a novel apparatus with which predetermined quantities of moldable material can be molded to article form in a rapid and satisfactory manner and by which articles of a smooth and finished form can be produced without need for the trimming of such articles for the removal of flash or gate material therefrom.

Another object of my invention is to provide a novel molding apparatus which is especially applicable to thermosetting materials and with which predetermined quantities of thermosetting material can be subjected to molding pressure between cooperating plungers in a manner such that articles of superior quality can be rapidly produced without wastage of material or need for a trimming operation.

A further object of my invention is to provide a novel molding apparatus in which a pair of cooperating plungers carry a "pill" or the like of moldable material into a mold body and subject the same to molding pressure therein after which the plungers carry the molded article out of the mold body.

Other objects and advantages of the invention will be apparent from the following description when taken in conjunction with the accompanying sheet of drawings, in which:

Fig. 1 is a partial longitudinal sectional view illustrating the novel molding apparatus with the opposed plungers thereof in a position to receive a pill of moldable material therebetween.

Fig. 2 is a similar view showing the pill carried into the mold body and about to be subjected to molding pressure.

Fig. 3 is a similar view showing the pill being molded to article form.

Fig. 4 is another such longitudinal sectional view showing the molded article shifted to the cooled section of the mold body, and Fig. 5 is still another longitudinal sectional view showing the step of discharging the molded article.

As already indicated in a general way, my novel apparatus is especially valuable for carrying out a molding operation where a proper quantity of the moldable material is in a preformed condition or shape commonly referred to as a "pill." In the accompanying drawing to which more detailed reference will now be made, I show such a pill 10 and also show a cap 11 as representing an article produced by my novel apparatus. The pill 10 may be any one of various known materials which are capable of being molded under the application of heat and pressure. For example, it can be a thermoplastic material such as Tenite or it can be a thermosetting material such as Bakelite.

The cap 11 representing the molded article comprises a hollow body having transverse top or end wall 12 and an annular depending skirt 13 provided with an internal screw thread 14. The skirt 13 is of cylindrical shape although my method is applicable to the production of articles of various other shapes.

In the drawing I show my novel apparatus as including a mold body 15 and a pair of opposed plungers 16 and 17 which are slidably operable in an opening 18 of the mold body. The opening 18 can be conveniently referred to as a bore or cylinder and corresponds in cross-sectional shape with the article to be molded which, in this instance, is the cap 11. The plungers 16 and 17 also correspond in cross-sectional shape with the article to be molded and their adjacent ends cooperate to form a mold cavity 20 in a portion of the bore 18.

The inner end of the plunger 17 has a threaded projection 21a thereon which extends into the cavity 20 as a core for forming the internally threaded recess in the cap 11. The inner end of the plunger 16 is likewise shaped to correspond with the transverse top or end wall 12 of the cap. The mold body 15 comprises a plurality of connected sections 21, 22 and 23 having smoothly aligned openings which form the bore 18. The section 21 supports the sections 22 and 23 and forms a guide for the plunger 17. The intermediate section 22 is a heated section having a coil 24 through which a suitable heating medium may be circulated. The section 23 is a cooled section having an opening or passage 25 therein to which a suitable cooling medium may be supplied. Air spaces 26 partially insulate the heated section 22 from the adjacent sections 21 and 23.

In Fig. 1 I show the plungers 16 and 17 in a position to receive therebetween the pill 10 of moldable material. In this pill-receiving position the plunger 17 has been entirely withdrawn from the mold body 15 and the plunger 16 has been extended so as to project through the mold body. In this position the adjacent ends of the plungers 16 and 17 are spaced apart so that the pill 10 can be inserted therebetween and placed on the end of the plunger 16.

Fig. 2 shows the plungers 16 and 17 as having been moved to a position in which their adjacent ends are located in the heated intermediate section 22 and define the mold cavity 20 therein.

The pill 10 has been carried into the heated section 22 by the movement of the plungers to this position and the pill is about to be subjected to molding pressure by the plungers.

In Fig. 3 the pill is shown as having been converted into the molded article 11 as the result of molding pressure applied to the pill by the plungers 16 and 17 and the heating of the pill by the mold section 22. The pill contains the correct amount of material to fill the cavity 20 and form the cap 11.

Following the molding operation of Fig. 3 as just described above, the plungers 16 and 17 are moved conjointly to shift the cavity 20 from the heated section 22 to the cooled section 23. This movement of the plungers carries the article 11 out of the heated zone and into the cooled zone in which the molded material is further solidified and hardened.

Further conjoint movement of the plungers 16 and 17 cause the article 11 to be shifted out of the cooled mold section 23 to an article discharging station 27 located outwardly of the mold section 23. At this station the plunger 17 is moved away from the plunger 16 and, because of the interengagement between the threads of the projection 21a and the skirt 13, the article 11 moves with the plunger 17 and is thus separated from the plunger 16. The molded article 11 can then be removed from the plunger 17 by being manually unscrewed from the projection 21a, or preferably, can be unscrewed by the engagement of a rubber-rimmed roller or disk 28 therewith. Upon removal of the article 11 from the projection 21 it drops out from between the plungers and falls into a suitable container.

The plungers 16 and 17 can be actuated in any suitable manner to produce the above described sequence of operations or steps. For example, the plunger 16 can be actuated by a suitable cam 29 engaging the lower end of the plunger and having an appropriate contour for raising and lowering the plunger and applying the desired pressure thereto. The lower end of the plunger 16 can be held in seating engagement with the cam 29 by gravity or spring pressure. The plunger 17 can be actuated by means of a suitable piston connected therewith and operable in the fluid cylinder 30 in response to either fluid or spring pressure or a combination of such pressures.

In the above described actuation of the plungers 16 and 17 it should be understood that the movement of the plungers may be a substantially continuous movement or, if desired, it can be an intermittent movement in which a desired interval of time is allowed for each step or operation. It will be understood also, that the cam 29 can be driven by any suitable power means and that the operation of the cam and cylinder 30 can be controlled by any suitable mechanism which will produce the above described sequence of operations for the cooperating plungers.

From the foregoing descriptions and the accompanying drawing it will now be readily understood that I have provided a novel molding apparatus by which desired articles can be rapidly produced from predetermined bodies or quantities of moldable material and which is especially valuable for producing articles from thermosetting materials. It will be seen also that my novel apparatus also provides for the rapid and economical production of molded articles of superior quality which do not require the trimming operations heretofore necessary for the removal of flash or gate material. Likewise it will be apparent that my novel apparatus permits the use of any desired degree of pressure during the molding operation.

While I have illustrated and described my novel apparatus in considerable detail it will be understood, of course, that I do not wish to be correspondingly limited but regard my invention as including all changes and modifications coming within the spirit of the invention and scope of the appended claim.

Having thus described my invention, I claim:

Molding apparatus for producing articles from thermosetting material or the like comprising, a stationary mold body having heated and cooled sections and a bore extending through said sections, a pair of opposed plungers slidable in said bore and their adjacent ends having die elements thereon corresponding in shape with the article to be molded, said adjacent ends being spaced apart and adapted to cooperate directly with each other and with the wall of said bore so as to define a mold cavity for said article in said heated section, said plungers cooperating with said bore for rapidly producing individual molded articles from said material and being relatively movable so as to open said cavity for the reception of a pill or the like of the moldable material and to subsequently close the cavity and subject said material to molding pressure therein in said heated section and said plungers being then movable conjointly in the same direction in said bore for shifting the mold cavity with the molded article therein out of said heated section and through said cooled section to the outer end of said bore so as to open said cavity for the discharge of the molded article and the reception of another pill or the like of said moldable material, and actuating devices for the respective plungers and cooperating to produce such sequential movements of the plungers.

LEE B. GREEN.